US012702971B2

(12) United States Patent
Korobkov et al.

(10) Patent No.: US 12,702,971 B2
(45) Date of Patent: Aug. 11, 2026

(54) CATALYST COMPOSITION FOR OLIGOMERIZATION REACTION

(71) Applicant: SABIC GLOBAL TECHNOLOGIES B.V., Bergen op Zoom (NL)

(72) Inventors: Ilia Korobkov, Riyadh (SA); Abdulaziz Al-Nezari, Riyadh (SA); Maher Matar Al-Dajane, Riyadh (SA); Sebastiano Licciulli, Riyadh (SA); Shahid Azam, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 18/721,805

(22) PCT Filed: Dec. 20, 2022

(86) PCT No.: PCT/EP2022/087115
§ 371 (c)(1),
(2) Date: Jun. 19, 2024

(87) PCT Pub. No.: WO2023/118226
PCT Pub. Date: Jun. 29, 2023

(65) Prior Publication Data

US 2025/0050317 A1 Feb. 13, 2025

(30) Foreign Application Priority Data

Dec. 23, 2021 (EP) .................................... 21217291

(51) Int. Cl.
*C07C 2/08* (2006.01)
*B01J 31/18* (2006.01)

(52) U.S. Cl.
CPC .......... *B01J 31/186* (2013.01); *B01J 2231/20* (2013.01); *B01J 2531/62* (2013.01)

(58) Field of Classification Search
None
See application file for complete search history.

(56) References Cited

U.S. PATENT DOCUMENTS 7,081,557 B2 7/2006 Mihan et al.
10,807,922 B2 10/2020 Kardash et al.
(Continued)

FOREIGN PATENT DOCUMENTS

CN 101252990 A 8/2008
CN 106573236 A 4/2017
(Continued)

OTHER PUBLICATIONS

Hill et al. Inorg. Chem., 1989, 28, 3461-3467 (Year: 1989).*
(Continued)

*Primary Examiner* — Yun Qian
(74) *Attorney, Agent, or Firm* — Womble Bond Dickinson (US) LLP

(57) ABSTRACT

The disclosure provides a catalyst reaction mixture including a ligand having a backbone with at least one phosphorus atom and at least one nitrogen atom, a chromium compound, and a solvent mixture including decalin and at least one additional solvent, wherein the solvent mixture comprises decalin in an amount of less than 20 wt. % and, optionally, perhydroindane in an amount of 50 wt. % or less, based on the total weight of the solvent mixture. A method of forming a linear alpha olefin through ethylene oligomerization is also provided, the method including contacting ethylene gas with a reaction mixture in a reactor, the reaction mixture including the catalyst reaction mixture of the disclosure; and withdrawing a product stream including at least one linear alpha olefin, such as 1-butene, 1-hexene, or 1-octene, from the reactor.

18 Claims, 1 Drawing Sheet

(56) References Cited

U.S. PATENT DOCUMENTS

| | | | | |
|---|---|---|---|---|
| 2010/0190939 | A1 | 7/2010 | Fritz et al. | |
| 2016/0167033 | A1 | 6/2016 | Woehl et al. | |
| 2017/0203288 | A1 | 7/2017 | Al-Hazmi et al. | |
| 2019/0144357 | A1 * | 5/2019 | Kardash | C07C 2/36<br>585/16 |
| 2023/0331641 | A1 * | 10/2023 | Azam | B01J 19/2445 |
| 2025/0256357 | A1 | 8/2025 | Seto | |

FOREIGN PATENT DOCUMENTS

| | | | |
|---|---|---|---|
| TW | 201518258 | A | 5/2015 |
| WO | 2012072178 | A1 | 6/2012 |
| WO | 2018012997 | A1 | 1/2018 |
| WO | 2020100007 | A1 | 5/2020 |
| WO | 2020100010 | A1 | 5/2020 |

OTHER PUBLICATIONS

Anonymous "Effect of Solvent Type on Ethylene Tetramerization Process" ip.com, No. IPCOM000180256D (Mar. 5, 2009).

Peulecke et al., "Ligands with NPNPN-framework and their application in chromium catalysed ethene tri-/Tetramerization" Dalton Transactions, 45 (2016).

* cited by examiner

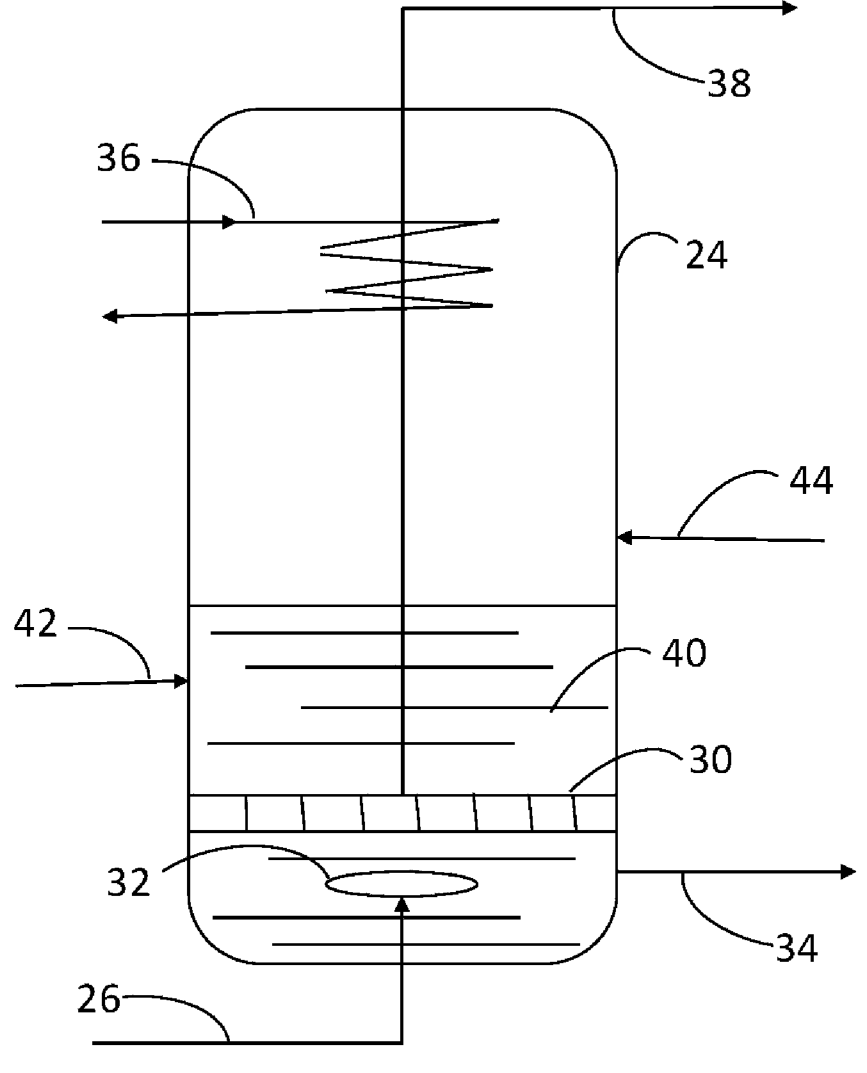
38
36
24
44
42
40
30
32
34
26

CATALYST COMPOSITION FOR OLIGOMERIZATION REACTION

CROSS-REFERENCE TO RELATED APPLICATIONS

The present application is a 371 U.S. national stage application of International Application No. PCT/EP2022/087115, filed Dec. 20, 2022, which claims priority from European Application No. 21217291.0, filed Dec. 23, 2021, all of which are incorporated herein by reference in their entirety.

TECHNOLOGICAL FIELD

The present disclosure relates to methods for forming a linear alpha olefin through ethylene oligomerization and catalyst compositions for use in such methods.

BACKGROUND

Linear olefins are a class of hydrocarbons useful as raw materials in the petrochemical industry and among these the linear alpha olefins, unbranched olefins whose double bond is located at a terminus of the chain, form an important subclass. Linear alpha olefins can be converted to linear primary alcohols by hydroformylation. Hydroformylation can also be used to prepare aldehydes, which in turn can be oxidized to afford synthetic fatty acids, especially those with an odd carbon number, useful in the production of lubricants. Linear alpha olefins are also used in the production of detergents, such as linear alkylbenzenesulfonates, which are prepared by Fiedel-Crafts reaction of benzene with linear olefins followed by sulfonation. Another important use of linear alpha olefins relates to production of linear low-density polyethylene (LLDPE) through catalytic co-polymerization with ethylene.

Preparation of alpha olefins is based largely on oligomerization of ethylene, which has a corollary that the alpha-olefins produced have an even number of carbon atoms. Oligomerization processes utilize a variety of different catalyst systems. In certain embodiments, the catalyst system comprises a chromium compound and a ligand having phosphorus and nitrogen atoms in its backbone, such as the catalyst composition set forth in US2017/0203288 to Al-Hazmi et al.

One of the main challenges of any oligomerization process is undesirable polymer formation, which leads to fouling in the reactor that requires periodic flushing or tedious mechanical cleaning to remove. Traditional ways to increase activity of the catalyst include increasing the reaction temperature or increasing the amount of co-catalyst used in the process. Both ways lead not only to larger quantities of target oligomers, but also to increases in the amount of polymer formed during the reaction. Increasing the amount of co-catalyst also makes the process significantly more expensive due to the typically high price of co-catalyst. There remains a need in the art for improving catalyst activity in oligomerization reactions without significantly increasing polymer formation.

BRIEF SUMMARY

Example implementations of the present disclosure are directed to methods for forming a linear alpha olefin through ethylene oligomerization and catalyst compositions for use in such methods, where the catalyst is combined with a mixture of solvents including a relatively minor amount of decalin. It has been surprisingly discovered that the presence of a minor amount of decalin can enhance catalyst activity without a significant increase in polymer formation or a significant loss of target oligomer selectivity.

The present disclosure includes, without limitation, the following embodiments.

Embodiment 1: A catalyst reaction mixture comprising a ligand having a backbone with at least one phosphorus atom and at least one nitrogen atom, a chromium compound, and a solvent mixture comprising decalin and at least one additional solvent, wherein the solvent mixture comprises decalin in an amount of less than 20 wt. % (e.g., about 5 to 20 wt. %) and, optionally, perhydroindane in an amount of 50 wt. % or less, based on the total weight of the solvent mixture.

Embodiment 2: The catalyst reaction mixture of Embodiment 1, wherein the decalin is present in an amount of about 15 wt. % or less, based on the total weight of the solvent mixture, such as about 5 to about 15 wt. % or about 8 to about 12 wt. %.

Embodiment 3: The catalyst reaction mixture of Embodiment 1 or 2, wherein the at least one additional solvent is selected from the group consisting of saturated or unsaturated linear or branched hydrocarbons, ethers, aromatic hydrocarbons which can be unsubstituted or substituted with halogens, halogenated alkanes, and combinations thereof, such as toluene, benzene, xylene, monochlorobenzene, dichlorobenzene, chlorotoluene, pentane, hexane, heptane, octane, nonane, decane, cyclohexane, methylcyclohexane, dichloroethane, dichlorobutane, or a combination thereof.

Embodiment 4: The catalyst reaction mixture of any one of Embodiments 1 to 3, wherein the ligand has the structure PNP, PNPN, PNNP, PNPNP, or NPNPN, wherein each P is a substituted phosphino group and each N is a substituted amino group, such as wherein the ligand has at least two nitrogen atoms in its backbone, such as wherein the ligand has the structure $(R^1)(R^2)N—P(R^3)—N(R^4)—P(R^5)—N(R^6)(R^7)$, where $R^1$, $R^2$, $R^3$, $R^4$, $R^5$, $R^6$, and $R^7$ can be each independently hydrogen, optionally substituted amino, trialkylsilyl, or optionally substituted $C_1$-$C_{20}$ hydrocarbyl, such as wherein $R^4$ is C1-C4 alkyl, $R^3$ and $R^5$ are each independently selected $C_6$-$C_{20}$ aryl or C3-C7 aliphatic groups, which may be cyclic or non-cyclic, linear or branched, substituted or unsubstituted, and $R^1$, $R^2$, $R^6$, and $R^7$ are each independently selected $C_1$-$C_{10}$ alkyl, such as $C_1$-C5 alkyl.

Embodiment 5: The catalyst reaction mixture of any one of Embodiments 1 to 4, wherein the ligand has the structure:

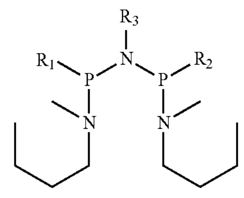

wherein $R_1$ and $R_2$ are independently cyclohexyl or phenyl, optionally substituted with one or more C1-C10 alkyl, such as C1-C5 alkyl, and $R_3$ is C1-C4 alkyl.

Embodiment 6: The catalyst reaction mixture of any one of Embodiments 1 to 5, wherein the chromium compound is an organometallic complex of Cr(III), such as Cr(III)acetylacetonate, Cr(III)octanoate, $Cr(III)Cl_3$(tetrahydrofuran)$_3$, Cr(III)-2-ethylhexanoate, Cr(III)chloride, Cr(III)-naphthenate, Cr(III) tris(2,2,6,6-tetramethyl-3,5-heptanedionate), or a combination thereof.

Embodiment 7: The catalyst reaction mixture of any one of Embodiments 1 to 6, further comprising a co-catalyst comprising an aluminum compound, such as trimethylaluminum, triethylaluminum, triisopropylaluminum, triisobutylaluminum, diethylaluminum chloride, ethylaluminum sesquichloride, ethylaluminum dichloride, methylaluminoxane, modified methylaluminoxane, or a combination thereof.

Embodiment 8: The catalyst reaction mixture of any one of Embodiments 1 to 7, further comprising ethylene and at least one linear alpha olefin, such as 1-butene, 1-hexene, or 1-octene.

Embodiment 9: A method of forming a linear alpha olefin through ethylene oligomerization comprising: contacting ethylene gas with a reaction mixture in a reactor, the reaction mixture comprising a ligand having a backbone with at least one phosphorus atom and at least one nitrogen atom, a chromium compound, and a solvent mixture comprising decalin and at least one additional solvent, wherein the solvent mixture comprises decalin in an amount of less than 20 wt. % (e.g., about 5 to 20 wt. %) and, optionally, perhydroindane in an amount of 50 wt. % or less, based on the total weight of the solvent mixture; and withdrawing a product stream comprising at least one linear alpha olefin, such as 1-butene, 1-hexene, or 1-octene, from the reactor.

Embodiment 10: The method of Embodiment 9, wherein the decalin is present in an amount of about 15 wt. % or less, based on the total weight of the solvent mixture, such as about 5 to about 15 wt. % or about 8 to about 12 wt. %.

Embodiment 11: The method of Embodiment 9 or 10, wherein the at least one additional solvent is selected from the group consisting of saturated or unsaturated linear or branched hydrocarbons, ethers, aromatic hydrocarbons which can be unsubstituted or substituted with halogens, halogenated alkanes, and combinations thereof, such as toluene, benzene, xylene, monochlorobenzene, dichlorobenzene, chlorotoluene, pentane, hexane, heptane, octane, nonane, decane, cyclohexane, methylcyclohexane, dichloroethane, dichlorobutane, or a combination thereof.

Embodiment 12: The method of any one of Embodiments 9 to 11, wherein the ligand has the structure PNP, PNPN, PNNP, PNPNP, or NPNPN, wherein each P is a substituted phosphino group and each N is a substituted amino group, such as wherein the ligand has at least two nitrogen atoms in its backbone, such as wherein the ligand has the structure $(R^1)(R^2)N—P(R^3)—N(R^4)—P(R^5)—N(R^6)(R^7)$, where $R^1$, $R^2$, $R^3$, $R^4$, $R^5$, $R^6$, and $R^7$ can be each independently hydrogen, optionally substituted amino, trialkylsilyl, or optionally substituted $C_1$-$C_{20}$ hydrocarbyl, such as wherein $R^4$ is C1-C4 alkyl, $R^3$ and $R^5$ are each independently selected $C_6$-$C_{20}$ aryl or C3-C7 aliphatic groups, which may be cyclic or non-cyclic, linear or branched, substituted or unsubstituted, and $R^1$, $R^2$, $R^6$, and $R^7$ are each independently selected $C_1$-$C_{10}$ alkyl, such as $C_1$-C5 alkyl.

Embodiment 13: The method of any one of Embodiments 9 to 12, wherein the ligand has the structure:

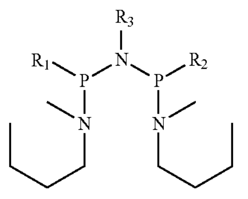

wherein $R_1$ and $R_2$ are independently cyclohexyl or phenyl, optionally substituted with one or more C1-C10 alkyl, such as C1-C5 alkyl, and $R_3$ is C1-C4 alkyl.

Embodiment 14: The method of any one of Embodiments 9 to 13, wherein the chromium compound is an organometallic complex of Cr(III), such as Cr(III)acetylacetonate, Cr(III)octanoate, $Cr(III)Cl_3$(tetrahydrofuran)$_3$, Cr(III)-2-ethylhexanoate, Cr(III)chloride, Cr(III)-naphthenate, Cr(III) tris(2,2,6,6-tetramethyl-3,5-heptanedionate), or a combination thereof.

Embodiment 15: The method of any one of Embodiments 9 to 14, further comprising a co-catalyst comprising an aluminum compound, such as trimethylaluminum, triethylaluminum, triisopropylaluminum, triisobutylaluminum, diethylaluminum chloride, ethylaluminum sesquichloride, ethylaluminum dichloride, methylaluminoxane, modified methylaluminoxane, or a combination thereof.

Embodiment 16: The method of any one of Embodiments 9 to 15, wherein the product stream comprises a polymer content of about 0.9 wt. % or less, based on the total weight of the product stream.

These and other features, aspects, and advantages of the present disclosure will be apparent from a reading of the following detailed description together with the accompanying FIGURE, which is briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying FIGURE which illustrates, by way of example, the principles of some described example implementations.

BRIEF DESCRIPTION OF THE FIGURES

Having thus described aspects of the disclosure in the foregoing general terms, reference will now be made to the accompanying FIGURE, which is not necessarily drawn to scale, and wherein:

FIG. 1 is a simplified schematic diagram of an example ethylene oligomerization reactor in accordance with the present disclosure.

DETAILED DESCRIPTION

Some implementations of the present disclosure will now be described more fully hereinafter with reference to the accompanying FIGURE, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form.

The following includes definitions of various terms and phrases used throughout this specification.

The term "hydrocarbyl" refers to any univalent radical derived from a hydrocarbon, such as any aliphatic group (e.g., alkyl groups such as methyl or cycloalkyl groups such as cyclohexyl) or any aryl group (e.g., phenyl).

The term "aliphatic" means an organic functional group or compound containing carbon and hydrogen joined together in straight chains, branched chains, or non-aromatic rings.

The term "alkyl" refers to a linear or a branched saturated hydrocarbon. Non limiting examples of alkyl groups include methyl, ethyl, propyl, butyl, pentyl, etc.

An "aryl" group or an "aromatic" group is a substituted or substituted, mono- or polycyclic hydrocarbon with alternating single and double bonds within each ring structure, such as a phenyl group. Non-limiting examples of aryl group substituents include alkyl, substituted alkyl groups, linear or branched alkyl groups, linear or branched unsaturated hydrocarbons, halogen, hydroxyl, alkoxy, haloalkyl, haloalkoxy, carboxylic acid, ester, amine, nitro, amide, nitrile, acyl, alkyl silane, thiol and thioether substituents. Non-limiting examples of alkyl groups include linear and branched C1 to C5 hydrocarbons. Non-limiting examples of unsaturated hydrocarbons include C2 to C5 hydrocarbons containing at least one double bond (e.g., vinyl). The aryl or alkyl group can be substituted with the halogen, hydroxyl, alkoxy, haloalkyl, haloalkoxy, carboxylic acid, ester, ether, amine, nitro ($-NO_2$), amide, nitrile ($-CN$), acyl, alkylsilane, thiol and thioether substituents. Non-limiting examples of polycyclic groups include ring systems that include 2 or more conjugated rings (e.g., fused aromatic rings) and substituted conjugated rings.

A "cyclohexyl" group is a substituted or unsubstituted, cyclic hydrocarbon group containing 6 carbon atoms. When fully saturated with hydrogen and having the formula $C_6H_{11}$, the cyclohexyl group is an unsubstituted cyclohexyl group. When at least one of the hydrogen atoms is replaced by another atom or functional group, the cyclohexyl group is a substituted cyclohexyl group.

Ethylene Oligomerization Process

Linear alpha olefins (LAOs) are olefins with a chemical formula $C_xH_{2x}$, distinguished from other mono-olefins with a similar molecular formula by linearity of the hydrocarbon chain and the position of the double bond at the primary or alpha position. Linear alpha olefins comprise a class of industrially important alpha-olefins, including 1-butene, 1-hexene, 1-octene, 1-decene, 1-dodecene, 1-tetradecene, 1-hexadecene, 1-octadecene, and higher blends of $C_{20}$-$C_{24}$, $C_{24}$-$C_{30}$, and $C_{20}$-$C_{30}$ olefins. Linear alpha olefins are useful intermediates for the manufacture of detergents, synthetic lubricants, copolymers, plasticizers, and many other important products.

Existing processes for the production of linear alpha olefins typically rely on the oligomerization of ethylene. For example, linear alpha olefins can be prepared by the catalytic oligomerization of ethylene in the presence of various catalyst systems.

The catalyst composition of the present disclosure typically includes a ligand having a backbone with at least one phosphorus atom and at least one nitrogen atom, a chromium compound, and a co-catalyst.

Typical ligand structures are organophosphorus compounds with two phosphino groups covalently linked through a linkage. Example ligands include compounds with any of the following backbone structures: PNP, PNPN, PNNP, PNPNP, or NPNPN, wherein each P is a substituted phosphino group (typically a secondary or tertiary phosphino group) and each N is a substituted amino group (typically a secondary or tertiary amino group), with example substituents for both the phosphino and amino groups including optionally substituted amino, trialkylsilyl, or optionally substituted C1-C20 hydrocarbyl (e.g., optionally substituted phenyl or optionally substituted cyclohexyl), with the optional substituents typically including amino or C1-C20 hydrocarbyl. In certain embodiments, the ligand backbone structure includes at least two N atoms (e.g., PNPN, PNNP, PNPNP, or NPNPN).

In certain embodiments, the ligand has an NPNPN structure, such as ligands of the formula I: $(R^1)(R^2)N-P(R^3)-N(R^4)-P(R^5)-N(R^6)(R^7)$, wherein $R^1$, $R^2$, $R^3$, $R^4$, $R^5$, $R^6$, and $R^7$ can be each independently hydrogen, optionally substituted amino, trialkylsilyl (e.g., trimethylsilyl or triethylsilyl), or optionally substituted $C_1$-$C_{20}$ hydrocarbyl. Examples of the $C_1$-$C_{20}$ hydrocarbyl groups include straight-chain or branched $C_1$-$C_{10}$ alkyl, $C_3$-$C_7$ cycloalkyl (e.g., cyclohexyl), $C_6$-$C_{20}$ aryl (e.g., phenyl), and $C_6$-$C_{20}$ alkyl-substituted $C_6$-$C_{20}$ aryl. In certain embodiments, each $R^1$, $R^2$, $R^3$, $R^4$, $R^5$, $R^6$, and $R^7$ is independently hydrogen, methyl, ethyl, isopropyl, tert-butyl, n-hexyl, cyclohexyl, or phenyl. In some embodiments, $R^4$ is methyl, $R^3$ and $R^5$ are each independently selected $C_6$-$C_{20}$ aryl (e.g., phenyl) or $C_3$-$C_7$ aliphatic groups (e.g., cyclohexyl), which may be cyclic or non-cyclic, linear or branched, substituted or unsubstituted, and $R^1$, $R^2$, $R^6$, and $R^7$ are each independently selected $C_1$-$C_{10}$ alkyl (e.g., $C_1$-C5 alkyl).

In certain embodiments of the above NPNPN formula, $R^3$ and $R^5$ are each independently a cyclic hydrocarbon group, a substituted cyclic hydrocarbon group, a linear hydrocarbon group or a branched hydrocarbon group having 1 to 10 carbon atoms including, isopropyl, tert-butyl, and substituted or unsubstituted cycloalkyl groups including cyclopentyl, cyclohexyl, cycloheptyl, substituted cyclopentyl, substituted cyclohexyl, and substituted cycloheptyl. In other embodiments, $R^3$ and $R^5$ are each independently an aromatic group or a substituted aromatic group, such as a phenyl group, a substituted phenyl group, or an aromatic group including two or more conjugated rings.

A subset of ligands of Formula I is shown below as Formula Ia:

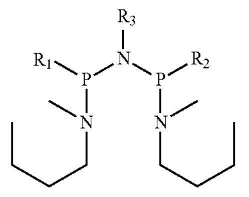

Formula Ia wherein $R_1$ and $R_2$ are independently cyclohexyl or phenyl, optionally substituted with one or more C1-C10 alkyl, such as C1-C5 alkyl, and $R_3$ is C1-C4 alkyl (e.g., methyl, ethyl, isopropyl, or butyl).

Table 1 below includes specific examples of ligands suitable for use in the present disclosure:

TABLE 1

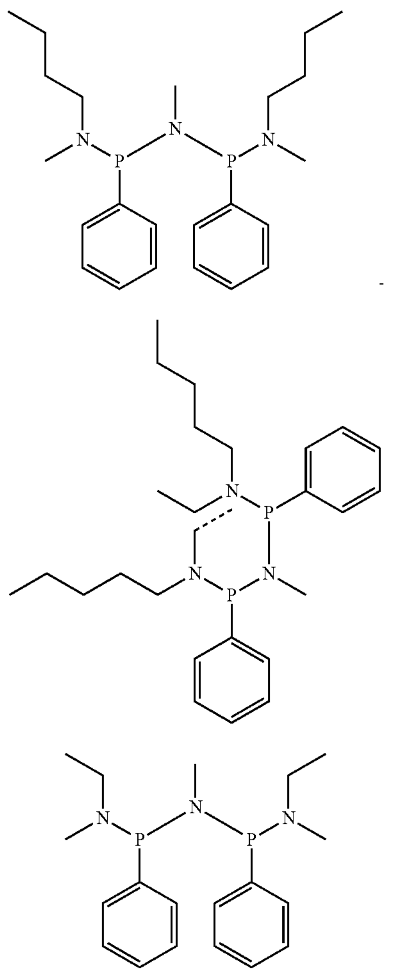

TABLE 1-continued

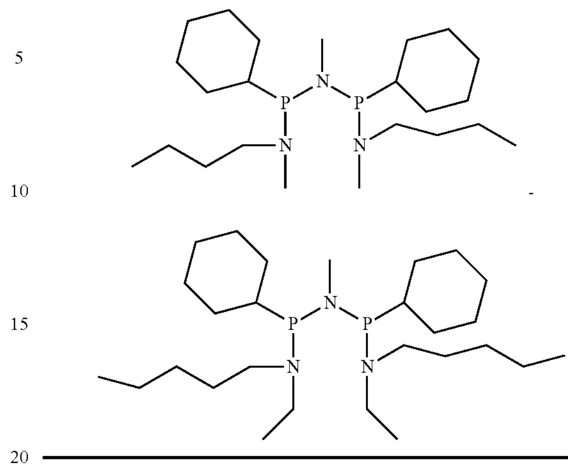

Optionally, the ligand can be a cyclic derivative wherein at least one of the P or N atoms of the ligand is a member of a ring system, or any cyclic derivative thereof wherein at least one of the P or N atoms of the NPNPN ligand is a member of a ring system. The ring system can be formed from one or more constituent compounds of the NPNPN ligand by substitution, i.e., by formally eliminating per constituent compound either two whole groups $R_1$-$R_7$ (as defined), one atom from each of two groups $R_1$-$R_7$ (as defined) or a whole group $R_1$-$R_7$ (as defined) and an atom from another group $R_1$-$R_7$ (as defined), and joining the formally so-created valence-unsaturated sites by one covalent bond per constituent compound to provide the same valence as initially present at a given site.

The ligands for use in the present disclosure can be made by synthetic approaches known to those skilled in the art, such as synthetic methods set forth in US2010/0190939 to Fritz et al.; US2016/0167033 to Woehl et al.; US2017/0203288 to Al-Hazmi et al.; WO2020/100007 to Al-Nezari et al; WO2020/100010 to Al-Nezari et al.; and Peulecke et al., Dalton Trans., 2016, 45, 8869, each of which is incorporated by reference herein.

The chromium compound is an organic salt, an inorganic salt, a coordination complex, or an organometallic complex of Cr(II) or Cr(III). In certain embodiments, the chromium compound is an organometallic complex, preferably of Cr(II) or Cr(III). Examples of the chromium compound include Cr(III)acetylacetonate, Cr(III)octanoate, Cr(III)$Cl_3$ (tetrahydrofuran)$_3$, Cr(III)-2-ethylhexanoate, Cr(III)chloride, Cr(III)-naphthenate, and Cr(III) tris(2,2,6,6-tetramethyl-3,5-heptanedionate). A combination comprising at least one of the foregoing chromium compounds can be used.

The concentration of the chromium compound can vary depending on the particular compound used and the desired reaction rate. In some embodiments, the concentration of the chromium compound is from about 0.01 to about 100 millimole per liter (mmol/l), about 0.01 to about 10 mmol/l, about 0.01 to about 1 mmol/l, about 0.1 to about 100 mmol/l, about 0.1 to about 10 mmol/l, about 1 to about 10 mmol/l, and about 1 to about 100 mmol/l. In one example embodiment, the concentration of the chromium compound is from about 0.1 to about 1.0 mmol/l.

The activator (also known in the art as a co-catalyst) is typically an aluminum compound, for example trimethylaluminum, triethylaluminum, triisopropylaluminum, triisobutylaluminum, diethylaluminum chloride, ethylaluminum sesquichloride, ethylaluminum dichloride, methylaluminoxane, or modified methylaluminoxane. A combination of different aluminum compounds can be used.

In some embodiments, the activator is a modified methylaluminoxane ("MMAO"), which refers to methylaluminoxanes containing alkyl substituents derived from $C_2$ or higher alkyl ligands in addition to methyl ligands, typically as a result of, for example, tetraalkyldialuminoxane and/or polyalkylaluminoxane reagents reacted with trimethylaluminum during preparation of the MMAO. One example MMAO is MMAO-3A (CAS No. 146905-79-5), which is a modified methylaluminoxane, type 3A, available from Akzo Nobel in toluene solution containing 7% aluminum, which corresponds to an MMAO-3A concentration of about 18%.

The molar ligand/Cr ratio can be from about 0.5 to 50, about 0.5 to 5, about 0.8 to about 2.0, about 1.0 to 5.0, or from about 1.0 to about 1.5.

The molar Al/Cr ratio can be from about 1 to about 1000, about 10 to about 1000, about 1 to 500, about 10 to 500, about 10 to about 300, about 20 to about 300, or from 50 to about 300.

The catalyst composition disclosed herein can be used in a process for the oligomerization of ethylene. In an embodiment, the process encompasses contacting ethylene with the catalyst composition under ethylene oligomerization conditions effective to produce target linear alpha olefins, such as 1-butene, 1-hexene, or 1-octene. It will be understood that other olefins, including branched olefins, can be produced as side products in this reaction.

The oligomerization of ethylene can be carried out at a pressure of from about 1 to about 200 bar, about 10 to about 200 bar, about 10 to about 100 bar, about 20 to about 70 bar, and about 10 to 50 bar. In certain embodiments, the oligomerization is carried out at a pressure from about 20 to about 70 bar.

The oligomerization of ethylene can also be performed at a temperature of from about 10 to about 200° C., about 20 to about 100° C., about 30 to about 100° C., about 40 to about 100° C., about 40 to about 80° C., or about 40 to about 70° C.

The oligomerization process can be carried out continuously, semi-continuously or discontinuously. In one embodiment, the process can be continuous and mean residence times can be 10 minutes to 20 hours, such as 30 minutes to 4 hours or 1 to 2 hours. Residence times can be chosen so as to achieve the desired conversion at high selectivity.

The process can be conducted in solution using an inert solvent mixture, which is advantageously non-reactive with the catalyst composition. The solvent mixture includes decalin and at least one additional solvent. Decalin (i.e., decahydronaphthalene also known as bicyclo[4.4.0]decane) is a bicyclic organic compound, and its structure is shown below.

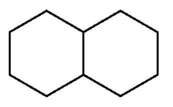

Decalin

The additional solvent utilized with decalin can include, but is not limited to, saturated or unsaturated linear or branched hydrocarbons, ethers, aromatic hydrocarbons which can be unsubstituted or substituted with halogens, halogenated alkanes, and combinations thereof. Specific examples include toluene, benzene, xylene, monochlorobenzene, dichlorobenzene, chlorotoluene, pentane, hexane, heptane, octane, nonane, decane, cyclohexane, methylcyclohexane, dichloroethane, dichlorobutane, or a combination thereof.

It has been surprisingly discovered that using decalin as a minority component of a solvent mixture, in combination with the catalyst system of this disclosure, results in enhanced catalyst activity without significant loss of oligomer selectivity or significant increase in polymer formation. In particular, using decalin in an amount of less than 20 wt. %, based on the total weight of the solvent mixture, is advantageous. In one embodiment, the decalin is present in an amount of about 5 to 20 wt. %, based on the total weight of the solvent mixture. In certain embodiments, the decalin is present in an amount of about 15 wt. % or less, based on the total weight of the solvent mixture, such as about 5 to about 15 wt. % or about 8 to about 12 wt. %. The remainder of the solvent mixture can include one or more additional solvents, such as those set forth above. Due to its high boiling point, use of decalin does not present any additional difficulties in separation of the target products by distillation.

In certain embodiments, the solvent mixture is substantially or completely free of perhydroindane, or contains relatively minor amounts of perhydroindane. For example, the solvent mixture can be characterized as comprising about 50 wt. % of perhydroindane or less, such as about 40 wt. % or less or about 30 wt. % or less or about 20% or less. In certain embodiments, the content of perhydroindane is about 10 wt. % or less or about 5 wt. % or less or about 2.5 wt. % or less or about 1 wt. % or less. Example ranges for perhydroindane contain include 0.0 wt. % to about 50 wt. % or about 0.0 wt. % to about 25 wt. %. In certain embodiments, the solvent mixture contains no detectable perhydroindane.

In certain embodiments, use of the solvent mixture of the present disclosure can increase catalyst activity as determined by ethylene consumption per weight of chromium compound during one hour of reaction time using units kg ethylene/$g_{Cr}$*h. In some embodiments, the catalyst activity can be greater than 128 kg/$g_{Cr}$*h, such as greater than 130 kg/$g_{Cr}$*h, greater than 132 kg/$g_{Cr}$*h, greater than 134 kg/$g_{Cr}$*h, greater than 136 kg/$g_{Cr}$*h, greater than 138 kg/$g_{Cr}$*h, or greater than 140 kg/$g_{Cr}$*h (e.g., about 128 to about 150 kg/$g_{Cr}$*h or about 130 to about 145 kg/$g_{Cr}$*h).

In certain embodiments, use of the solvent mixture of the present disclosure boosts the catalyst activity while retaining the olefin selectivity without increase in unwanted polymer formation. For example, polymer content in the product stream can be about 0.9 wt. % or less, about 0.8 wt. % or less, about 0.7 wt. % or less, about 0.6 wt. % or less, about 0.5 wt. % or less, or about 0.4 wt. % or less (e.g., about 0.3 wt. % to about 0.9 wt. % or about 0.3 wt. % to about 0.7 wt. % or about 0.3 wt. % to about 0.5 wt. %), based on the total weight of the product stream. Unwanted polymer species are defined as polymer species having a molecular weight of at least 650 Da, and typically include species that are insoluble in the reactor media and needed to be filtered or otherwise removed.

The process can be carried out in any reactor, such as a loop reactor, a plug-flow reactor, or a bubble column reactor. Oligomerization of ethylene is an exothermic reaction that can be cooled by a surplus flow of ethylene. The gases leaving at a top portion of the reactor can be cooled using a series of external coolers and condensers. The gas phase, after further cooling, can be recycled.

A bottom stream leaving the oligomerization reactor from a bottom portion can contain the active catalyst and unreacted ethylene. The reaction can be terminated to avoid undesirable side reactions by removing catalyst components from the organic phase through extraction with a caustic aqueous phase. Contact with the caustic aqueous phase can result in formation of nonreactive minerals corresponding to the catalyst components.

The organic phase, after passage through the catalyst removal system, can pass through a molecular sieve absorption bed and can then be fed to a distillation column to recover dissolved ethylene. Recovered ethylene can be recycled via an ethylene recycle loop while the product is fed to an intermediate vessel, after which the product can be fed to a separation section. In certain embodiments, the linear alpha olefins produced from the reactor can be directed into a separation train.

Bubble Column Reactor

In an embodiment, the oligomerization process can be carried out in a bubble column reactor. FIG. 1 depicts an example bubble column reactor 24 for use in the present disclosure. Ethylene can be introduced using feed stream 26 to the reactor 24 via a gas distribution system attached to a bottom section of the bubble column reactor, which typically includes one or both of a gas sparger plate 30 and a gas bubbler 32. The gas distribution system disperses the gaseous ethylene evenly throughout the reactor 24. Gaseous ethylene rises up through a liquid composition 40 within the reactor 24, which typically includes linear alpha olefins and reaction byproducts, the solvent mixture described herein, and a catalyst composition. For example, catalyst can enter the reactor 24 through a catalyst injection stream 42. Solvent can enter the reactor 24 through solvent injection stream 44. An oligomerization reaction can occur as the gaseous ethylene interacts with the liquid composition, producing reaction products that can include polymer droplets and linear alpha olefin droplets.

The liquid heavy linear alpha olefins, together with the solvent and the catalyst, can be withdrawn from the bottom section of the reactor 24 via bottom effluent stream 34. A portion of the formed linear alpha olefins, which are gaseous under reaction conditions, can be condensed at a top portion of the reactor using an internal condenser 36 and can serve as reflux for cooling purposes, taking advantage of the respective heat of evaporation. Gaseous ethylene and light linear alpha olefins can be removed at the top of the bubble column reactor via top effluent stream 38. One or both effluent streams can be further treated using additional downstream processing units, such as condensers, heat exchangers, distillation columns, and the like.

Experimental

Catalyst performance in the presence of various solvent compositions was evaluated through ethylene oligomerization reaction carried out in a stainless steel pressure reactor at 45° C. Dry n-heptane and decalin were used in various solvent combinations, MMAO-3A was used as a co-catalyst, and Cr(II)acetylacetonate was used as a chromium compound. A ligand of Formula Ia was used, where $R_1$ and $R_2$ are phenyl and $R_3$ is methyl.

Results summary is presented in Table 2 below. Product distribution was evaluated by GC-MS analysis and activity of the catalyst activity was calculated based on ethylene consumption during one hour of reaction time. The table provides the yield of 1-hexene (C6 total) as well as the 1 wt. of 1-hexene within all C6 olefins separated. The same information is provided for 1-octene. Amount of polymer formed is also provided.

TABLE 2

| Experiment | Solvent | Activity ($kg/g_{Cr}$ * h) | % wt. 1-C6 total | % wt. of 1-C6 in C6 total | % wt. 1-C8 total | % wt. of 1-C8 in C8 total | Polymer % wt. |
|---|---|---|---|---|---|---|---|
| 1 | n-heptane (100% wt.) | 125.3 | 21.6 | 74.2 | 76.7 | 99.5 | 0.52 |
| 2 | n-heptane with 5% wt. decalin | 128.2 | 22.0 | 73.4 | 76.3 | 99.6 | 0.41 |
| 3 | n-heptane with 10% wt. decalin | 144.4 | 22.0 | 73.3 | 76.3 | 99.6 | 0.33 |
| 4 | n-heptane with 15% wt. decalin | 135.9 | 22.1 | 73.1 | 76.3 | 99.5 | 0.50 |
| 5 | n-heptane with 20% wt. decalin | 131.9 | 22.2 | 73.1 | 76.0 | 99.5 | 0.70 |
| 6 | decalin (100% wt.) | 70.4 | 23.6 | 72.3 | 74.0 | 99.7 | 1.40 |

As shown in Table 2, use of solvent mixtures containing minor amounts of decalin, such as 5-20 wt. %, can increase catalyst activity as compared to use of n-heptane alone. Alternatively, the data above show that the addition of decalin will allow lowering the catalyst to co-catalyst ratio while preserving the same catalyst performance characteristics. The presence of minor amounts of decalin does not have detrimental impact on selectivity of the reaction for desired oligomers, such as C6 or C8 oligomers, and does not significantly increase polymer formation. Indeed, at 5-15 wt. % decalin, polymer formation is reduced as compared to n-heptane alone. Use of decalin as the sole solvent results in greatly reduced catalyst activity and increased polymer formation, as compared to use of n-heptane alone.

Although not bound by a theory of operation, these experimental results may be explained by an increase in ethylene solubility in the reaction solvent, making ethylene more readily available to the activated catalyst. Activation of chromium species by aluminum alkyl co-catalyst leads to the formation of extremely reactive species. If ethylene is not readily available in solution, such species undergoes a decomposition with the formation of different chromium compounds. Such compounds promote polymerization instead of oligomerization activity.

However, addition of larger amounts of decalin to the reaction mixture appears to detrimentally impact catalyst performance, lowering overall catalyst activity. This could be explained by a decrease of the solubility of the active catalytic species in the reaction solvent when decalin concentration exceeds a certain percentage. Increase of viscosity of the solvent with greater addition of decalin might also cause ethylene mass transfer limitations, leading to decrease in catalytic activity.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

Many modifications and other implementations of the disclosure will come to mind to one skilled in the art to which this disclosure pertains having the benefit of the teachings presented in the foregoing descriptions and the associated FIGURE. Therefore, it is to be understood that the disclosure is not to be limited to the specific implementations disclosed herein and that modifications and other implementations are intended to be included within the scope of the appended claims. Although specific terms are employed herein, they are used in a generic and descriptive sense only and not for purposes of limitation.

What is claimed is:

1. A catalyst reaction mixture comprising a ligand having a backbone with at least one phosphorus atom and at least one nitrogen atom, wherein the ligand has the structure $(R^1)(R^2)N—P(R^3)—N(R^4)—P(R^5)—N(R^6)(R^7)$, wherein $R^1$, $R^2$, $R^3$, $R^4$, $R^5$, $R^6$, and $R^7$ are each independently hydrogen, optionally substituted amino, trialkylsilyl, or optionally substituted $C_1$-$C_{20}$ hydrocarbyl, a chromium compound, and a solvent mixture comprising decalin and at least one additional solvent, wherein the solvent mixture comprises decalin in an amount of about 5 to 20 wt. % and contains perhydroindane in an amount of 50 wt. % or less, based on the total weight of the solvent mixture.

2. The catalyst reaction mixture of claim 1, wherein the decalin is present in an amount of about 5 to about 15 wt. %, based on the total weight of the solvent mixture.

3. The catalyst reaction mixture of claim 1, wherein the at least one additional solvent is selected from the group consisting of saturated or unsaturated linear or branched hydrocarbons, ethers, aromatic hydrocarbons which can be unsubstituted or substituted with halogens, halogenated alkanes, and combinations thereof.

4. The catalyst reaction mixture of claim 1, wherein the ligand has the structure:

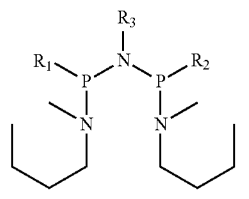

wherein $R_1$ and $R_2$ are independently cyclohexyl or phenyl, optionally substituted with one or more C1-C10 alkyl, and $R_3$ is $C_1$-$C_4$ alkyl.

5. The catalyst reaction mixture of claim 1, wherein the chromium compound is an organometallic complex of Cr(III).

6. The catalyst reaction mixture of claim 1, further comprising a co-catalyst comprising an aluminum compound.

7. The catalyst reaction mixture of claim 6, wherein the aluminum compound is trimethylaluminum, triethylaluminum, triisopropylaluminum, triisobutylaluminum, diethylaluminum chloride, ethylaluminum sesquichloride, ethylaluminum dichloride, methylaluminoxane, modified methylaluminoxane, or a combination thereof.

8. The catalyst reaction mixture of claim 1, further comprising ethylene and at least one linear alpha olefin.

9. The catalyst reaction mixture of claim 1, wherein the at least one additional solvent is selected from the group consisting of toluene, benzene, xylene, monochlorobenzene, dichlorobenzene, chlorotoluene, pentane, hexane, heptane, octane, nonane, decane, cyclohexane, methylcyclohexane, dichloroethane, dichlorobutane, and combinations thereof.

10. The catalyst reaction mixture of claim 1, wherein $R^4$ is C1-C4 alkyl, $R^3$ and $R^5$ are each independently selected $C_6$-$C_{20}$ aryl or $C_3$-$C_7$ aliphatic groups, and $R^1$, $R^2$, $R^6$, and $R^7$ are each independently selected $C_1$-$C_{10}$ alkyl.

11. A method of forming a linear alpha olefin through ethylene oligomerization comprising:

i) contacting ethylene gas with the reaction mixture of claim 1 in a reactor; and ii) withdrawing a product stream comprising at least one linear alpha olefin from the reactor.

12. The method of claim 11, wherein the decalin is present in an amount of about 5 to about 15 wt. %, based on the total weight of the solvent mixture.

13. The method of claim 11, wherein the at least one additional solvent is selected from the group consisting of saturated or unsaturated linear or branched hydrocarbons, ethers, aromatic hydrocarbons which can be unsubstituted or substituted with halogens, halogenated alkanes, and combinations thereof.

14. The method of claim 11 wherein $R^4$ is C1-C4 alkyl, $R^3$ and $R^5$ are each independently selected $C_6$-$C_{20}$ aryl or C3-C7 aliphatic groups, and $R^1$, $R^2$, $R^6$, and $R^7$ are each independently selected $C_1$-$C_{10}$ alkyl.

15. The method of claim 11, wherein the ligand has the structure:

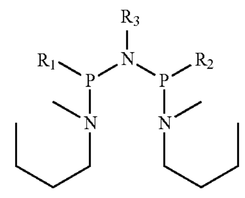

wherein $R_1$ and $R_2$ are independently cyclohexyl or phenyl, optionally substituted with one or more C1-C10 alkyl, and $R_3$ is C1-C4 alkyl.

16. The method of claim 11, wherein the chromium compound is an organometallic complex of Cr(III).

17. The method of claim 11, further comprising a co-catalyst comprising an aluminum compound.

18. The method of 11, wherein the product stream comprises a polymer content of about 0.9 wt. % or less, based on the total weight of the product stream.

* * * * *